Jan. 2, 1951  W. A. HIGINBOTHAM  2,536,808
FAST IMPULSE CIRCUITS
Filed March 8, 1949   4 Sheets-Sheet 1

INVENTOR.
William A. Higinbotham

INVENTOR.
William A. Higinbotham

Jan. 2, 1951   W. A. HIGINBOTHAM   2,536,808
FAST IMPULSE CIRCUITS
Filed March 8, 1949   4 Sheets-Sheet 3

INVENTOR.
William A. Higinbotham
BY
Roland A. Anderson
Attorney

Jan. 2, 1951 W. A. HIGINBOTHAM 2,536,808
FAST IMPULSE CIRCUITS
Filed March 8, 1949 4 Sheets-Sheet 4

INVENTOR.
William A. Higinbotham
BY
Roland A. Anderson
Attorney

Patented Jan. 2, 1951

2,536,808

UNITED STATES PATENT OFFICE 2,536,808

FAST IMPULSE CIRCUITS

William A. Higinbotham, Upton, N. Y., assignor to the United States of America as represented by the United States Atomic Energy Commission Application March 8, 1949, Serial No. 80,271

13 Claims. (Cl. 250—27)

This application is a continuation-in-part of application Serial Number 566,001, filed November 30, 1944.

This invention relates broadly to impulse responsive circuits and, more particularly, to circuits and apparatus adapted to generate impulses at a fractional rate of the occurrence of observed phenomena.

Circuits of this type are necessary to enable the recording or indicating by mechanical instruments of the rate of occurrence of phenomena in the form of short impulses occurring in rapid succession.

A representative case of such phenomena is the generation of particles by radioactive and nuclear disintegration. The rate of occurrence of such particles may extend into the megacycle per second range.

The apparatus organization for the measuring of the rate of occurrence of observed phenomena comprises three major processes.

The first process effects the translation of the observed physical phenomena into electrical impulses. For example, the occurrence of particles generated by radioactivity are translated into corresponding electrical impulses by means of the ionization chamber.

The second major process in measuring the rate of occurrence of observed phenomena is the scaling down of the rate of occurrence into a rate in the order of magnitude within the capabilities of recording or indicating instruments.

The third process comprises the translation of electrical impulses generated at a rate within the order of capability of a mechanical instrument into an indication or recording.

The present invention is confined to circuits and apparatus for the accomplishment of the translation of fast occurring electrical impulses into electrical impulses which occur at a fraction of said rate. A device applied to the purpose is subject to rigorous requirements with respect to speed of response and accuracy. The rate of occurrence of electrical impulses impressed on the device may range from a few to a megacycle or more per second. The amount of scaling down required may therefore be of extremely high order. It follows that if each stage of the device is inherently capable of scaling down by a factor of two, a large scaling factor requires the inter-coupling of a large number of stages. A single spurious impulse generated by the last stage of $n$ cascaded stages, results in an error of $2^n$ in the count of the phenomena being observed.

A number of types of scaling down circuits are known in the prior art.

One category of such circuits utilizes gaseous discharge tubes of the thyratron type in a counting circuit known as the Wynn-Williams type and described in "Theory and Application of Electron Tubes" by Reich, 2nd edition, pages 486 and 487, published by the McGraw-Hill Book Company. Impulse frequency dividing circuits of this type are limited in their speed of operation due to de-ionization time and, therefore, are restricted in their use to the counting of pulses which occur at a rather low frequency per second.

Another kind of frequency dividing circuit utilizes grid controlled vacuum tubes in trigger circuits generally of the Eccles-Jordan type. The principle of operation underlying the use of the trigger circuit is that two electrical impulses properly impressed on the circuit are required to cycle the circuit once. Therefore, a connection to one of the tubes enables one pulse to be derived for every two input pulses impressed on the circuit.

Counting circuits utilizing hard vacuum tubes in circuits of the Eccles-Jordan or flip-flop type necessitate the use of an electronic switch for commutating observed input pulses alternately into the trigger tubes. The operation of the electronic switch is preferably automatically synchronized with the tubes in the trigger circuit by means of voltages derived from the trigger circuit. Examples of such circuits are presented by the patent to Michel, No. 2,348,016 and in the article entitled "A 'Scale-of-Two' High Speed Counter Using Hard Vacuum Tubes," by Lewis, written in the Proceedings of the Cambridge Philosophical Society, 1937, volume 33, pages 549 to 558.

It has been found that the circuits of the prior art, although effective for the purposes for which they were designed, are deficient upon application to the accurate counting of impulses occurring at a fast rate.

In accordance with the present invention, an improved circuit for translating the rate of occurrence of electrical impulses into a known fractional rate is accomplished by the combination of known types of trigger circuits with a novel form of commutation and interlocking system.

The trigger circuit of the Eccles-Jordan type is capable of operating at high speeds provided the time constants of the cross-coupling networks are kept small and, in addition, that means be provided for commutating pulses into the circuit without materially lengthening the time constants of the trigger circuit.

A further consideration arises due to the fact that the trigger circuit inherently provides a scaling factor of two. The attainment of scaling factors greater than two requires the coupling together of a plurality of trigger circuits in such manner as to operate in sequence. Such a combination of trigger circuits is capable of operating at high speeds provided the commutating of the input impulses in proper sequence into the respective trigger circuits is accomplished with networks having short time constants, and connected in such manner as not to materially lengthen the response time of the trigger circuits. In addition to the above consideration, means must be provided for de-activating certain of the coupled trigger circuits in order to permit response of each circuit only in its proper turn. Here again, the de-activation circuit must have a short time constant and must not lengthen the response time of the trigger circuits to which connected.

It is, therefore, an object of this invention to provide an impulse rate dividing circuit capable of responding to input pulses having a very high rate of occurrence.

Another object is the provision of a system for coupling a source of electrical impulses to a trigger circuit in such manner as to prevent impulse transmission back into the impulse source.

Still another object is the provision of interlocking coupling means between trigger stages in such manner as to enable operation of coupled trigger circuits in sequence.

Other and further objects and advantages will become apparent as the description proceeds.

The invention is described by reference to the accompanying drawing in which.

Figure 1:
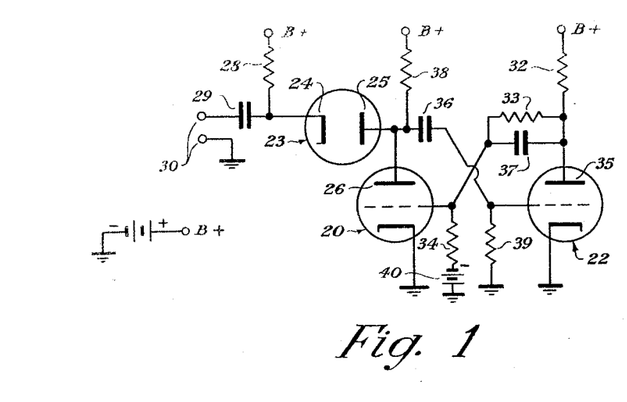
Figure 1 is an electrical circuit diagram illustrating in basic form the application of an improved electronic switch to a univibrator.

In the arrangement illustrated in Figure 1, a univibrator is shown coupled to a source of electrical impulses by means of the improved commutating means of this invention. The univibrator is of a common type comprising tubes 20 and 22 having anodes and grids cross-connected in the usual manner. The input commutating network comprises a rectifier so connected to one of the univibrator anodes that it is biassed to a neutral condition until it delivers an input pulse and is then automatically biassed to non-conduction until the univibrator is again in a condition to be activated by a succeeding pulse.

In this embodiment, the rectifier is shown as a diode having a cathode 24 and an anode 25. It is understood that, although diodes of the vacuum tube variety are shown, the term diode is intended to include all types of rectifiers or unidirectional conductors.

The cathode 24 of the diode is connected to the positive terminal marked B+ of a common source of anode potential. The anode of the diode is connected to the anode 26 of normally-off tube 20 of the univibrator. It follows that the diode electrodes 24 and 25 are at equal potentials whenever univibrator tube 20 is not conducting. It also follows that a conducting state of univibrator tube 20 causes a voltage drop in anode load resistor 38 so that the diode anode is at a lower potential than the cathode and therefore disconnects the univibrator from the source of electrical impulse.

Operation of the circuit thus described in response to impulses impressed on input terminals 30 is as follows: Tube 22 is initially conducting for the reason that its grid is not biassed negatively. The anode current of this tube causes a voltage drop in the anode resistor 32. The grid of tube 20 is connected in a voltage divider network comprising resistors 32, 33 and 34. Resistor 34 is so proportioned with respect to resistors 33 and 32 and bias potential source 40 that the grid of tube 20, during conduction of tube 22, is biassed below cut-off. The values of resistors 33 and 34 and the value of the bias potential source also are so proportioned that tube 20 is conductive when tube 22 is cut off due to the full available positive B+ potential being applied across the resistors. Therefore, in the initial condition, tube 20 is non-conducting, tube 22 is conducting and anode 35 of tube 22 is negative relative to the value of the B+ potential. Anode 26 of tube 20 and both cathode 24 and anode 25 of the electron switch diode tube 23 are at the full B+ potential. There is, therefore, no appreciable potential difference between the diode electrodes. Upon the impression of a sharp, negative pulse on the input terminals 30, the potential of cathode 24 is depressed with respect to anode 25 thereby rendering diode 23 conducting. The negative pulse is therefore transferred to the anode 26 and through condenser 36 to the grid of tube 22. The negative pulse on the grid of tube 22 results in a positive pulse at its anode and therefore a positive pulse is impressed on the grid of tube 20. The positive pulse on the grid of tube 20 results in a negative pulse in its anode circuit which depresses further the grid potential of tube 22 and also cuts off electronic switch 23. The cycle of action thus described is self-perpetuating with the result that in a very short time, tube 22 becomes completely cut off and tube 20 completely conducting.

Condenser 37 is provided to transfer the high frequency components of the voltage pulse generated at anode 35 to the grid of tube 20. Resistors 33 and 34 have a value so chosen that tube 20 remains conducting so long as tube 22 is non-conducting. Condenser 37 may be of small value with the result that the time constant of the network comprising condenser 37 and resistor 33 may be very short.

The set of conditions thus far obtained in the circuit is such that the anode 35 is at the full B+ potential while anodes 26 and 25 are at low potential due to the IR drop across resistor 38.

Upon the cessation of the negative going pulse applied to input terminals 30, the cathode 24 of the diode tube regains the full B+ potential as soon as the charge on condenser 29 dissipates through resistor 28, whereas, the anode 25 is maintained at less than B+ potential by the anode current drop through resistor 38. It follows that the trigger tubes are effectively disconnected from the source of input pulses for as long as tube 20 remains conducting.

The trigger circuit in this embodiment being a univibrator, conduction is automatically transferred back to initially conducting tube 22 due to the grid of tube 22 returning to the cathode potential as the charge on condenser 36 is dissipated through resistor 39. Tube 22 begins again to conduct at a time determined by the time rate of change of the voltage drop across resistor 38, the time constant determined by condenser 36 and resistor 39, and the cut off potential of tube 22. Immediately upon the start of conduction of tube 22, anode 35 drops in potential and this negative going potential is impressed upon the grid of tube 20 through the RC network 33 and 37, and resistance 34. The negative pulse applied to the grid of tube 20 starts the cycle of operations which very quickly restores full conduction to tube 22 and cuts off tube 20. The circuit is now back in its original stage.

It is important to note that during the time that tube 20 is conducting and after the very short interval taken by the network 28 and 29 to recover, the cathode 24 of the switching diode is at the full B+ potential while the anode is at a value less than full B+ potential with the result that no current can flow through the rectifier 23 during the recovery process in the trigger stage and therefore, no impulse arising in the trigger stage can be reflected back to the input terminals 30.

Further, because the commutating diode 23 becomes open-circuited immediately after its function is accomplished, the circuit elements associated with the input circuit are disconnected from those elements in the trigger circuit which determine its speed of response.

A considerable advantage is derived from the fact that the commutating diode is coupled into the anode circuit of the trigger stage. Transients arising in the power supply effect both electrodes of the diode equally, thereby eliminating any susceptibility of the trigger circuit to respond to transients creating in this manner.

Another advantage derived from the described mode of connection is that even the capacitance of the switching diode 23 is largely isolated from the control grids in the trigger circuit. The reason for this is that the impulse generated in the anode circuit of tube 20 has a steep termination. The high frequency components of the impulse are transferred to the grid of tube 22 through condenser 36 which therefore can be very small.

The diminutive capacitance of condenser 36, therefore, isolates to a considerable extent the capacitance of diode 23 as well as the circuit components associated therewith. It follows that the characteristics of the diode or other type of rectifier are not critical.

Figure 2:
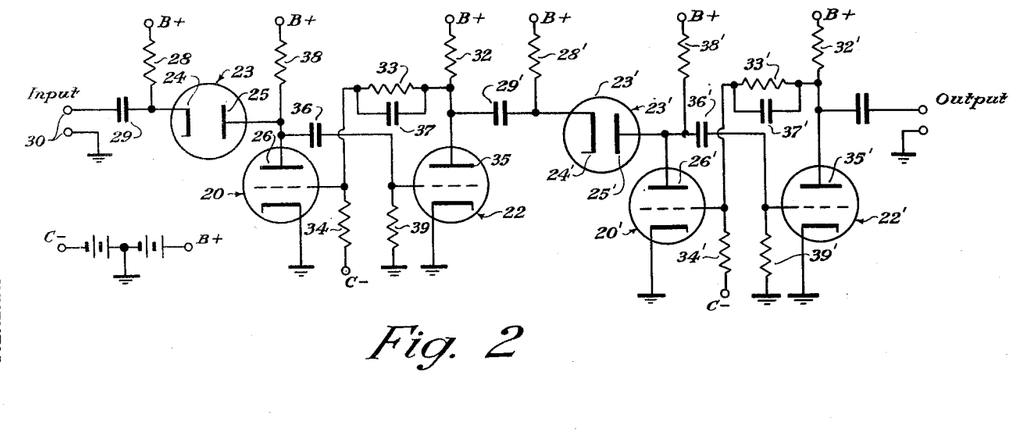
Figure 2 is a circuit diagram of two univibrators coupled in cascade by an extended application of the electronic switch shown in Figure 1.
Figure 3:
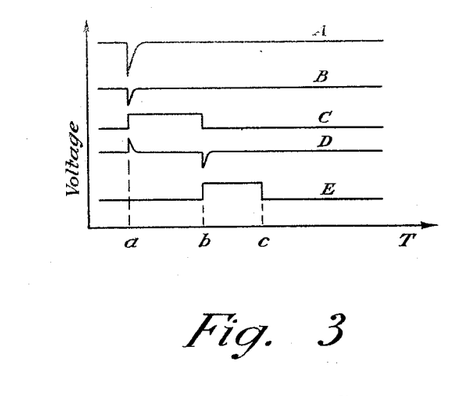
Figure 3 is a series of charts showing pulse sequence in the circuit of Figure 2.

An extension of the above principles to cascaded trigger stages is explained with reference to Figures 2 and 3. By way of example, a univibrator stage similar to that discussed with reference to Figure 1 is shown coupled to a second identical univibrator. The components of the second univibrator are similar to those in the first univibrator and are therefore indicated by the same reference numerals in prime form. The second univibrator is coupled to the anode of tube 22 by means of the switching diode 23'.

Upon the impression of a negative pulse on the first univibrator stage, the sequence of events which follow are explained with reference to Figure 3. Curve A shows the negative pulse impressed on input terminals 30. Curve B shows the resultant pulse impressed on cathode 24 of the switching diode 23. Curve C shows the resultant positive pulse generated at the anode of tube 22. The length of this positive pulse is determined by the product of condenser 36 and resistor 39. Curve D shows the differentiated pulse derived from passing the positive pulse generated by tube 22 through network 29' and 28'. The differentiated pulses are impressed on cathode 24' of switching diode 23'. The first differentiated pulse occurring at time $a$ does not affect the second univibrator for the reason that the switching diode 23' is open-circuited to positive pulses. The second differentiated pulse occurring at time $b$ is negative and therefore is passed by switching diode 23' and is impressed on the anode 26' of tube 20'. This negative pulse is transferred to the grid of tube 22' through condenser 36' and therefore results in a positive pulse at the anode 35' as shown in curve E. The length of the positive pulse appearing on anode 35', that is to say, the duration $b—c$ in Figure 3, is fixed by the product of condenser 36' and resistor 39'.

From the foregoing, it is seen that although selected pulses derived from the first univibrator are injected into the second univibrator, no pulses created by the action of the second univibrator can be reflected back into the first univibrator. The reason for this is the disconnect-characteristic of the commutating diode 23' due to the mode of connection in circuit.

In the application of trigger circuits to the division of the frequency of occurrence of pulses to be counted, the trigger circuits of the flip-flop type rather than the univibrator have particularly advantageous characteristics. The reason for this is that unlike the univibrator, the flip-flop circuit has two conditions of stability thereby necessitating the application of two negative pulses to the tubes in order to complete one cycle of the circuit.

Figure 4:
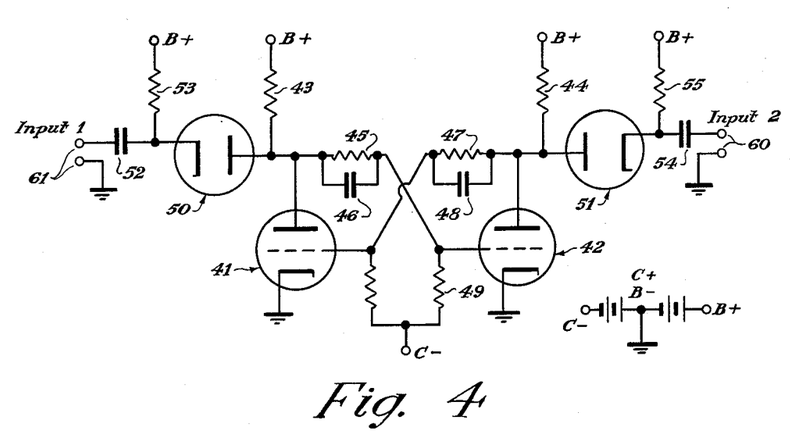
Figure 4 is a circuit diagram showing the combination of a pair of electronic switches for properly commutating pulses from two sources into an Eccles-Jordan trigger circuit.

Referring to Figure 4, the novel electronic switch of this invention is shown applied to a typical Eccles-Jordan flip-flop circuit. The circuit comprises two triode tubes 41 and 42 each having an anode load resistor 43 and 44 respectively, and cross-coupling networks comprising resistor 45 and condenser 46, and resistor 47 and condenser 48, respectively. The value of the circuit components are so chosen in the usual manner that this circuit has two stable conditions. That is, if one tube is conducting, the grid of the other tube is held below cut off. Coupled to the respective anodes are two commutating diodes 50 and 51 and networks comprising condenser 52 and resistor 53, and condenser 54 and resistor 55, respectively. The operation of this circuit requires that electrical impulses be applied alternately to the grids of the two tubes. Operation is as follows:

Starting with the assumption that tube 41 is conducting and an externally derived pulse is impressed on the right-hand input terminals 60, a negative component of the pulse is transferred to the grid of tube 41 through the switching diode 51. The action of the negative pulse impressed on tube 41 results in the transfer of conduction to tube 42. As soon as conduction of tube 42 starts, the anode of switching diode 51 drops in value thereby disconnecting the first pulse source from the trigger circuit. Return of conduction to tube 41 is obtained by the impression of a negative pulse on input terminals 61, and as soon as tube 41 becomes conductive, the second pulse source is disconnected from the trigger circuit.

Figure 5:
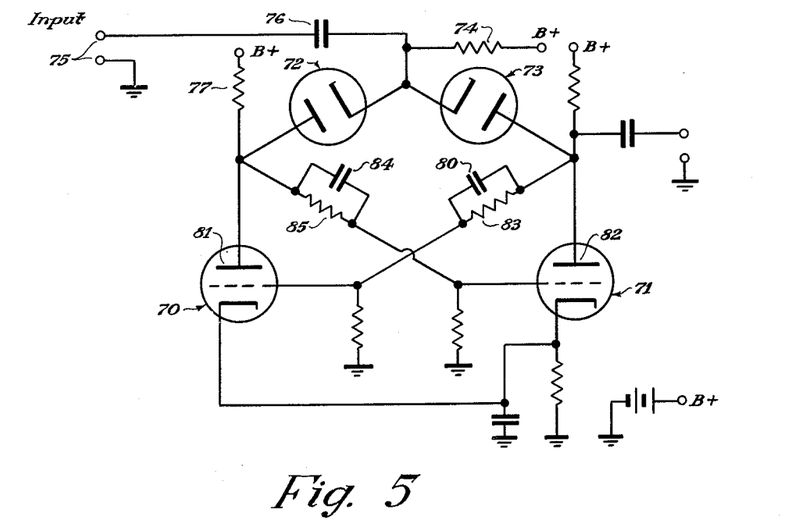
Figure 5 is a circuit diagram showing a single pole double throw electronic switch so connected to an Eccles-Jordan trigger circuit as to properly commutate a single source of pulses whereby results a scale-of-two circuit.

To the end that pulses derived from a single source will be impressed alternately on the tubes of a flip-flop circuit, the commutating diodes are arranged as shown in Figure 5. The resultant circuit, having a capacity to cycle once for every two input pulses, is known as a scaler or scale-of-two circuit. Two triodes 70 and 71, respectively, are shown connected similarly to those shown in Figure 4. Two commutating diodes, each having an anode and a cathode, have their anodes connected to the anodes of the trigger tubes in the same manner as that described with respect to Figure 4. The diode cathodes are connected together and through a resistance 74 are connected to the common source of anode potential. The cathodes thus joined are coupled to input terminals 75 through coupling condenser 76. Operation of the circuit is as follows:

It is assumed that tube 70 is initially conducting, causing the usual voltage drop in anode resistor 77. The value of the parts is such that the grid of tube 71 is thereby biassed negatively to cut off. The cathodes of switching diodes 72 and 73 are at the full B+ potential. The potential of the anode of diode 73 is the same as that of the cathode but the anode of diode 72 is depressed due to the potential drop created by the current of tube 70 through anode resistor 77. The application of a negative pulse upon the input terminals therefore results in a negative pulse being commutated only through diode 73 to the anode of tube 71. This negative pulse is transferred through cross-coupling condenser 80 to the grid of tube 70. A slight reduction in anode current of tube 70 is caused, thereby creating a positive pulse on the anode 81 which is transferred to the grid of tube 70. The positive pulse on the grid of tube 71 causes a negative pulse on its anode 82 which is transferred to the grid of tube 70. The transfer is accumulative, tube 70 is very quickly cut off, and tube 71 becomes fully conducting. The circuit is now in readiness for a second impressed pulse to reverse conditions and thereby complete the cycle. That is, the anode of commutating diode 72 is now at full B+ potential, a potential substantially equal to that of its cathode. Therefore, the next negative impressed pulse will be transferred only through diode 72 to the anode circuit of tube 70 and thence through small condenser 84 to the grid of tube 71.

The rapidity with which the scaler circuit of Figure 5 can respond to input pulses depends upon the time constants of the networks 84—85, and 80—83. This time constant is greatly shortened due to the fact that, except when transferring a pulse at the proper time into a responsive circuit, the commutating diode disconnects the input circuit. It follows that the only capacitances and resistances in the trigger circuit are those provided therein by the circuit elements and by the exercise of suitable precautions in lay-out and wiring, spurious capacitances can be minimized. In addition, tubes having low grid-to-cathode capacitance can be utilized to obtain extremely high operating speeds.

The basic expedient of this invention, which is the application of a properly biassed unidirectional conductor connected to anode circuits of trigger tubes, is applicable in the cascading of scaler circuits.

Figure 6:
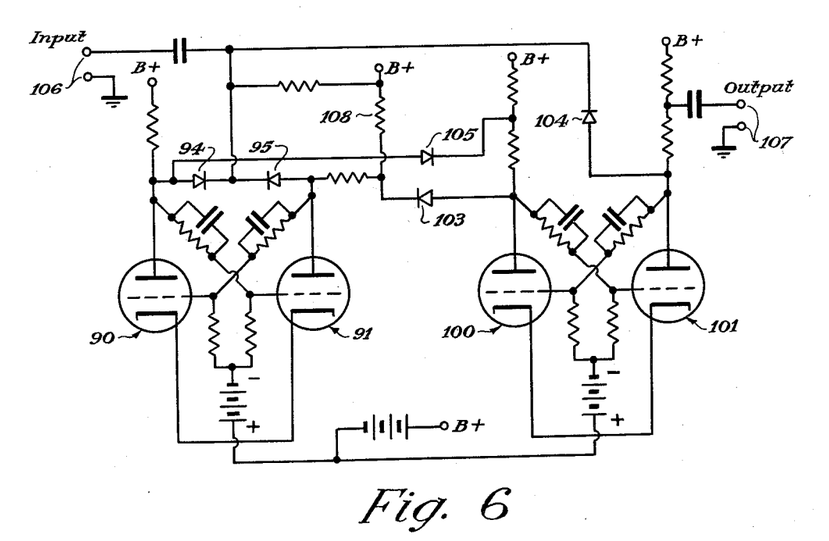
Figure 6 shows a scale-of-two circuit connected by means of the electronic switching circuit of the present invention to an Eccles-Jordan trigger circuit.

In addition, the second novel application of unidirectional conductors for the purpose of deactivating otherwise sensitive stages is now explained with reference to Figure 6.

A scale-of-two circuit is coupled to a flip-flop circuit in such a way that spurious responses due to feed-back are eliminated. The scale-of-two circuit comprises tubes 90 and 91 connected in the usual manner and provided with commutating diodes 94 and 95 connected in the manner of Figure 5. The flip-flop circuit includes tubes 100 and 101 provided with commutating diodes 103 and 104 connected in the manner of Figure 4. An additional switching diode 105 is provided for a purpose presently to become apparent.

Operation of this circuit is now analyzed through a series of input pulses. Assuming an input pulse is impressed on input terminals 106 and that, initially, tubes 91 and 101 are conducting, the input pulse is passed by switching diode 94 to the grid of tube 91 due to the fact that the anode of non-conducting tube 90 is at full B+ potential. Since tubes 91 and 101 are conducting, the anodes of these tubes are at decreased potential and therefore, commutating diodes 95 and 104 are open-circuited thereby blocking the input pulse from the grids of tubes 90 and 100. The application of the negative pulse to the anode of tube 90 with resultant transfer to the grid of tube 91, causes tube 90 to become conducting and tube 91 to become non-conducting.

The resulting full B+ potential on each electrode of diode 95 renders it conducting to the second input negative pulse so that the second pulse is transferred to the grid of tube 90 thereby causing the scaler trigger stage to resume its original state. The regaining of a state of conductivity by tube 91 simultaneously creates a voltage drop in anode resistor 108 thereby positively biassing diode 103. Accordingly, the negative pulse generated by tube 91 is transferred to the anode of tube 100 and from thence to the grid of tube 101. As a result, tube 101 cuts off and during the process thereof, renders tube 100 conducting.

An explanation of the reaction of the circuit to the third input pulse serves to explain the use of the commutating diode for deactivating an otherwise ready input circuit so as to prevent operation of a trigger stage out of turn.

The scaler circuit comprising tubes 90 and 91 is in original condition with tube 90 non-conducting so that a third input pulse would normally be passed by diode 94 to the anode of tube 90 and from thence to the grid of tube 91 to cause it to respond. This action is prevented by the interlocking diode 105 which biasses to cut-off input commutating diode 94 in response to the state of conductivity of flip-flop tube 100. The third input pulse, therefore, is effective only in re-setting the condition of flip-flop tubes 100 and 101 because tube 101, being non-conducting, no potential drop exists in its anode circuit and, therefore, commutating diode 104 is conducting. It follows that, in response to the application of three input impulses on the input terminals 106 of the combined circuits, the flip-flop circuit, comprising tubes 100 and 101, has undergone one cycle of operations and one impulse is generated on output terminals 107. Therefore, the combination of a scale-of-two circuit and a flip-flop circuit properly coupled by means of the switching diodes of this invention, results in a scale-of-three circuit.

Figure 7:
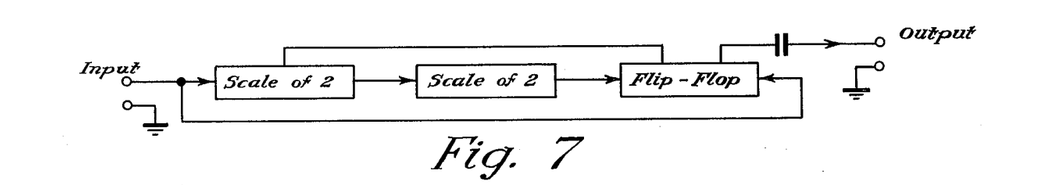
Figure 7 is a diagrammatic representation of several scale-of-two trigger circuits combined with an Eccles-Jordan trigger circuit to provide a division factor of five.

The novel arrangement including the commutating or switching diode is a flexible expedient making possible many other desirable scaling factors. For example, Figure 7 diagrammatically shows two scale-of-two circuits connected in series and followed by a flip-flop circuit. The second scale-of-two feeds one side of the flip-flop circuit. The flip-flop circuit controls an interlocking switching diode for the purpose of disabling the first scaler except on the first four out of each five input pulses. Pulses to be counted are impressed on the first scaler and from thence to the second scaler and then to the flip-flop in the manner of Figure 6. This arrangement provides a division factor of 5. The addition of another scale-of-two similarly connected in series with the first two scale-of-two circuits provides a scale-of-nine. It follows that the division factor of this type of circuit is $(2^n+1)$ where $n$ equals the number of scales-of-two. Further, the provision of a scale-of-two circuit preceding or following the circuit of Figure 7 provides a total scaling or dividing factor of 10.

It is seen, therefore, that any scaling factor may be obtained by combining commutating and interlocking diodes with a suitable choice of scaling and flip-flop circuits.

By way of example, the following table is a guide to the selection of basic circuits properly coupled by commutating diodes to obtain a number of selected scaling factors.

Scale of 3 = scale of 2 + flip-flop
Scale of 4 = scale of 2 × scale of 2
Scale of 5 = scale of 4 + flip-flop
Scale of 6 = scale of 2 × scale of 3
Scale of 7 = scale of 6 + flip-flop
Scale of 8 = (scale of 2)$^3$
Scale of 9 = scale of 3 × scale of 3
Scale of 10 = scale of 2 × scale of 5

Figure 8:
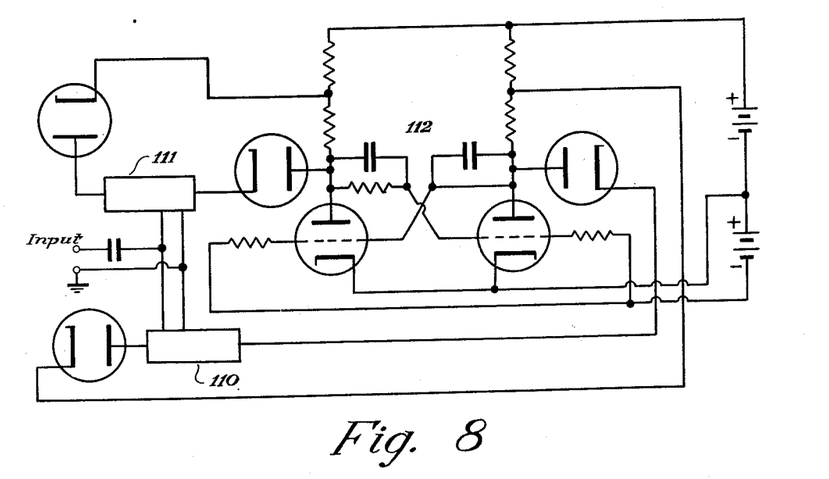
Figure 8 is a schematic representation of the commutation system of the present invention arranged for separating generating pulses into two channels.

Further variations are available in the arrangement of the basic circuits for the accomplishment of other desired purposes. For example, Figure 8 shows an arrangement whereby pulses derived from a single source may be separated in accordance with a selected sequence into two channels. Input pulses are impressed on the two channels identified by the numerals 110 and 111. Each channel consists of a selected number of cascaded scalers chosen in accordance with the above table. The output of the two channels are coupled to the two sides of a flip-flop circuit identified generally by the numeral 112. The provision of a switching diode feed-back arrangement for coupling anode potentials in the flip-flop circuit back to the input channels results in alternately switching a selected number of input pulses from one channel to the other. Thus, if channel 111 is initially "open," it accepts signals until it flips the flip-flop circuit 112, then the signals enter channel 110 until the flip-flop circuit reverts to its original condition. By the provision of output terminals connected to one of the flip-flop anodes, the total scaling factor is the sum of the division factors of channels 110 and 111. On the other hand, if intermediate terminals are provided in the outputs of channels 110 and 111, the input pulses are divided and separated into two sets of sequential pulses. The ratio of the number of pulses in the two sets corresponds inversely to the scaling factor of the two respective channels. This type of circuit is useful in computers and in machine operations. Output terminals may be provided at selected points within the channels so that groups of pulses may be obtained having a relation to the input pulses depending on the scaling factors existing up to the selected points.

Figure 9:
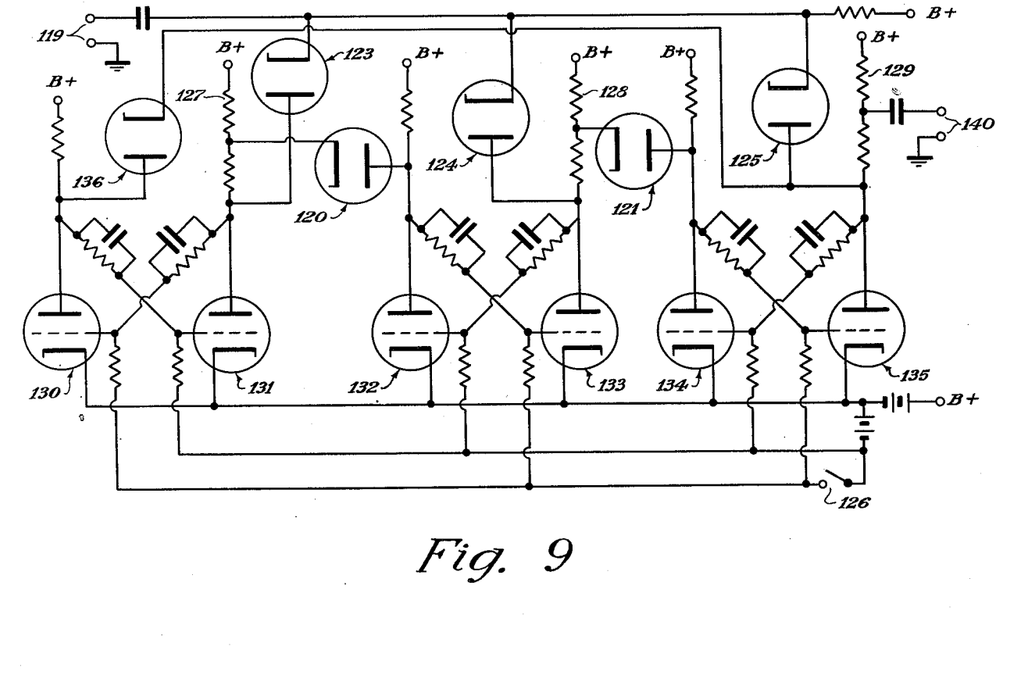
Figure 9 is a circuit diagram of a ring scaler circuit comprising hard vacuum tubes properly commutated by the improved switching means of this invention.

The application of the principles thus far discussed are applicable to a ring scaler circuit such as shown in Figure 9.

Three flip-flop trigger circuits are provided and are coupled to each other by commutating diodes 120 and 121. The source of input pulses is commutated to the several trigger stages in proper sequence by commutating diodes 123, 124 and 125.

The initial ready condition of the circuit is that in which the left-hand tube in the first stage and the right-hand tube in the remaining stages are conducting. This initial state is accomplished through the provision of reset switch 126 which is opened for a short duration thereby enabling the imposition of a high positive potential on the grids of the left-hand tube in the first stage and on the right-hand tube in the remaining stages. The initial condition having been obtained, switch 126 is closed.

The first input pulse is impressed on input commutating diodes 123, 124 and 125. The anode of diode 123 is connected to the anodes of trigger tube 131 which is not conducting. Therefore, the diode 123 is not negatively biased and is in functioning condition. However, the anodes of commutating diodes 124 and 125 are connected to the anodes of trigger tubes 133 and 135. These tubes are conducting with the result that the anode potentials are depressed and therefore, the commutating diodes 124 and 125 are negatively biassed and open-circuited.

The first input impulse, therefore, is commutated by diode 123 to the anode of tube 131 and from thence to the grid of tube 130. As a result, conduction is transferred from tube 130 to tube 131 in the first stage.

Conduction by tube 131 creates a negative pulse in anode load resistor 127 thereby depressing the potential of the cathode of coupling diode 120 with the result that the pulse is transferred to the anode of tube 132 and from thence to the grid of tube 133. This action results in tube 132 becoming conductive and tube 133 becoming non-conductive. The result of tube 133 becoming non-conductive is the preparation of commutating diode 124 for passing the second input pulse to the anode of tube 133 and from thence to the grid of tube 132. The second input pulse, therefore, renders tube 133 conducting thereby generating a negative going pulse in anode load resistor 128 which is commutated through diode 121 to the anode of tube 134 and from thence to the grid of tube 135. This action results in tube 135 becoming non-conductive and tube 134 conductive. The resultant increase in potential of the anode of commutating diode 125 readies it to transfer the third input pulse to tube 134 thereby causing the third trigger stage to flop back to its original conduction. Therefore, the third input pulse causes tube 135 to again become conductive, and to generate a negative pulse across anode load resistor 129. This negative pulse is commutated back to tube 130 through commutating diode 136 thereby re-setting the first stage for response to the fourth input pulse.

It follows that a ring scaler circuit has a division factor equal to the number of stages. Therefore, in the embodiment of Figure 9, three input pulses on input terminals 119 result in one output pulse at output terminals 140.

From the foregoing disclosure, it is seen that what has been described is a novel electronic switching circuit coupled in the anode circuits of scale-of-two and flip-flop circuits which makes possible greater speed of operation and greater reliability than obtainable in circuits avaliable in the prior art. Further, by the use of the diode switching circuits described, close matching of tubes and parts is unnecessary and deterioration of circuit components due to use does not affect the reliability of the device.

A further advantage of the novel combination of trigger circuits and commutating rectifiers of the present invention lies in the unidirectional characteristic of the biassed diode which results in independence from input wave form provided a high negative rate of change is present in each cycle. Therefore, among other applications, the circuits of this invention are applicable to the measurement of any type of wave energy having a steep negative rate of change termination for each cycle.

The invention has been described particularly with reference to triode tube vacuum tubes in trigger circuits. However, any other type of grid controlled vacuum tube can be used.

Although the invention has been described with reference to certain specific embodiments, other modifications are possible. Therefore, the invention is intended to be restricted only by the appended claims as interpreted in view of the prior art.

What is claimed is:

1. In combination, a trigger circuit having a first and a second cross-coupled grid-controlled vacuum tube having at least one stable condition of conductivity and a common source of anode potential; means for triggering the circuit comprising a rectifier having a positive and negative terminal, means for connecting the positive terminal to the anode of the first of said vacuum tubes, and a resistance connecting the negative terminal to said common source of positive potential, whereby said rectifier is negatively biassed when the first vacuum tube is conducting and is conductive under the impression of a negative pulse on the negative terminal when the first vacuum tube is not conducting.

2. In combination, a trigger circuit having first and second cross-coupled grid-controlled vacuum tubes, an anode load resistance connecting each of the anodes of said tubes to a source of positive anode potential; and means for commutating negative input pulses only to the grid of the conducting tube comprising a rectifier having a positive and negative terminal, means connecting the positive terminal to the anode of the first vacuum tube and impedance means connecting the negative rectifier terminal to a source of potential substantially equal in value to the source of anode potential, a source of negative pulses connected to said rectifier negative terminal having a peak value not exceeding the potential difference between the anode of the first vacuum tube when conducting and the anode potential source whereby said source of negative pulses are coupled to the grid of the second vacuum tube only when said first vacuum tube is in a condition of non-conduction.

3. In combination with a trigger circuit comprising a pair of thermionic tubes each having a cathode, grid and anode, and having the grids and anodes connected by cross-coupling networks in such manner that only one tube is capable of steady conduction at a time, said networks including a load resistance connected between a source of anode potential and each of the anodes; means for commutating triggering pulses into said trigger circuit comprising at least one rectifier having an anode and a cathode, means connecting the rectifier anode to a trigger tube anode whereby the potential on the rectifier anode is that of the trigger tube anode potential, a resistance connecting the rectifier cathode to a source of potential equal in value to the anode potential source whereby the rectifier is negatively biassed to a condition of non-conduction when said trigger tube anode is conducting current and is zero biassed substantially when said trigger tube anode is not conducting current, means for impressing impulses having negative components on said rectifier cathode whereby said impulses trigger the trigger circuit when the said trigger tube anode is not conducting, and do not affect the trigger circuit when said trigger tube anode is conducting.

4. In combination with a trigger circuit having first and second thermionic tubes each having at least a cathode, control electrode and anode being cross-coupled by anode to grid networks, means for commutating triggering impulses into said trigger circuit comprising a unidirectional conductor having a first and second terminal, means for connecting one terminal of the unidirectional conductor to the anode of the trigger circuit first tube, and a resistance connecting the second unidirectional conductor terminal to a source of positive potential having a value of potential equal to that of the first trigger tube anode under a condition of non-conduction, and means for impressing input pulses having a negative rate of charge on the said unidirectional conductor second terminal, whereby under the condition that the negative excursions of the input pulses do not exceed in peak value the potential of the positive potential source minus the first trigger tube anode potential when conducting, said unidirectional conduction is able to impress triggering pulses on the trigger circuit only when said first trigger tube is non-conducting.

5. In combination with a univibrator having first and second grid-controlled tubes cross-coupled whereby the first tube is capable of a stable condition of conductivity, means for commutating negative pulses to the grid of the first tube comprising a rectifier having a cathode and anode, said rectifier anode being connected to the univibrator second tube anode whereby it is impressed with the full potential of an anode potential source when said second tube is not conducting, means connecting the cathode of the rectifier to said anode potential source whereby the rectifier is capable of conduction only during a condition of non-conductivity of the said second tube, and a source of pulses having a negative rate of change coupled to the rectifier cathode whereby said source of pulses is coupled to the grid of the conducting first tube to terminate the conduction thereof and render the second tube conducting thereby negatively biassing the rectifier and isolating the univibrator from the source of pulses until the original state of univibrator balance is restored in the usual manner.

6. An impulse generating circuit adapted to generate impulses at half the rate of impulses impressed thereon comprising a trigger circuit and input impulse commutation means, said trigger circuit comprising a pair of vacuum tubes each including at least a cathode, grid and anode, resistance networks cross-connected between the anodes and grids whereby the grid bias is a function of the opposed anode potential, resistance means connected between each anode and a source of anode potential, said input impulse commutation means comprising a pair of rectifiers each having a first and second terminal and being adapted to pass current under a condition of a potential on the second terminal positive with respect to the potential on the first terminal, means conductively connecting the second terminal of one rectifier to one trigger tube anode and means conductively connecting the second terminal of the other rectifier to the other trigger tube anode, means for impressing a positive potential on the first terminals of each of the rectifiers equal respectively to the potential of the anode of the tube to which it is connected under the condition of non-conduction of said tube, and means for impressing input impulses on the first terminals of the rectifiers.

7. In combination with a trigger circuit of the Eccles-Jordan type comprising a pair of grid controlled thermionic tubes; means for converting the same to a scale-of-two comprising a pair of unidirectional conducting means each having a first and second terminal and being adapted to pass current only under the condition of the existence of potential on the second terminal positive with respect to the potential on the first terminal, means conductively connecting each of the second terminals to a respective one of the trigger tube anodes, means conductively connecting the first terminals together and to a source of impulses, a resistance connected to the first terminals, and means for impressing a positive potential on the free end of said resistance having a value equal to the potential of a trigger tube anode under the condition of non-conduction, whereby said unidirectional conducting means are adapted to commutate negative components of input impulses only to the grid of the conducting trigger tube.

8. An impulse generator comprising a scale-of-two trigger circuit comprising a first and second grid controlled thermionic tube coupled to a flip-flop circuit comprising a first and second grid controlled thermionic tube and adapted to generate one impulse for every three impulses successively impressed on the combined circuit, comprising a pair of rectifiers having their anodes connected to the anodes of the scale-of-two trigger tubes, and having their cathodes connected together and to a source of input impulses and to a source of positive potential, means for commutating impulses generated by the second tube of the scale-of-two trigger circuit to the first tube of the flip-flop circuit comprising a rectifier having its anode connected to the anode of the first flip-flop tube and its cathode conductively connected with the anode of the second tube of the scale-of-two, means for commutating the third of each successive three input impulses to the grid of the first tube of the flip-flop circuit comprising a rectifier having its anode connected to the anode of the flip-flop second tube and its cathode connected to the cathodes of the first mentioned pair of rectifiers; means for disabling the scale-of-two trigger circuit from functioning under the influence of the third pulse comprising a rectifier having its cathode connected in the anode circuit of the first flip-flop tube and its anode connected to the first scale-of-two tube anode and output terminals coupled to the second flip-flop tube anode to provide thereat one impulse for every three impulses impressed on the combined circuit.

9. An impulse rate dividing circuit comprising a plurality of trigger circuits each having a first and a second tube each having at least a cathode, grid and anode, a rectifier coupling successive trigger circuits each comprising a cathode and an anode and having the cathode connected to each second tube anode and the anode connected to each first tube anode; a rectifier having a cathode and an anode and being connected between the second tube of the last trigger circuit and the first tube of the first trigger circuit with the rectifier anode connected to the anode of the second tube of the last trigger circuit and the cathode connected to the anode of the first tube of the first trigger circuit; a plurality of rectifiers each having an anode and a cathode and having the anodes individually connected to the second tube anodes of each trigger circuit, means connecting the cathodes together to a source of positive potential, means for rendering the first tube of the first trigger stage and the second tube of the remaining trigger stages initially conducting, whereby each trigger circuit in response to an impulse impressed thereon activates the next successive trigger circuit for response to the next successive input impulse; terminal means connected to the last trigger circuit anode whereby a rate of $1/n$ impulses per second are generated in response to $n$ input impulses per second on $n$ number of trigger circuits so connected.

10. An impulse rate dividing circuit comprising a plurality of trigger circuits each having a first and a second tube each having at least a cathode, grid and anode, a rectifier coupling successive trigger circuits each comprising a cathode and an anode and having the cathode connected to each second tube anode and the anode connected to each first tube anode; a plurality of rectifiers each having an anode and a cathode and having the anodes individually connected to the second tube anodes of each trigger circuit, means connecting the cathodes together to a source of positive potential, means for rendering the first tube of the first trigger stage and the second tube of the remaining trigger stages initially conducting, whereby each trigger circuit in response to an impulse impressed thereon activates the next successive trigger circuit for response to the next successive input impulse.

11. In combination with a trigger circuit comprising at least one thermionic tube having an anode load circuit connected between the thermionic tube anode and a source of anode potential, a unidirectional current conducting device having an anode and a cathode, means connecting the anode to the thermionic tube anode, a resistance connecting the device cathode to a source of potential having a value equal to the potential of said thermionic tube source of anode potential, and a capacitor having one terminal connected to the device cathode whereby said device is adapted to impress impulses on said thermionic tube anode circuit under the influence of negative impulses impressed on the condenser free terminal only under a condition of current non-conduction of the thermionic tube.

12. In combination, a trigger circuit having at least one grid controlled vacuum tube including an anode, and means for triggering the circuit comprising a rectifier having a cathode and an anode, means for connecting the rectifier anode to the trigger tube anode, and resistance means for impressing a positive potential on the rectifier cathode having a value equal to the trigger tube anode under the non-conducting condition, whereby the rectifier is negatively biassed and open circuited when the trigger tube is conducting and is conductive under the impression of negative going potentials when the first vacuum tube is not conducting.

13. In combination with a trigger circuit comprising at least one thermionic tube having an anode load circuit connected between the thermionic tube anode and a source of anode potential, a unidirectional current conducting device having an anode and a cathode, means connecting the anode to the thermionic tube anode, a resistance connecting the device cathode to a source of potential having a value equal to the potential of said thermionic tube source of anode potential, and a terminal connected to the device cathode whereby said device is adapted to impress impulses on said thermionic tube anode circuit under the influence of negative impulses impressed on the terminal only under a condition of current non-conduction of the thermionic tube.

WILLIAM A. HIGINBOTHAM.

No references cited.